(12) United States Patent
Itaya (10) Patent No.: US 8,107,922 B2
(45) Date of Patent: Jan. 31, 2012

(54) MOBILE PORTABLE TERMINAL, ENTRANCE-EXIT MANAGING APPARATUS, AND FUNCTION SUPPRESSION CANCELLATION PROGRAM STORAGE MEDIUM

(75) Inventor: Hisanori Itaya, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 1010 days.

(21) Appl. No.: 11/853,940

(22) Filed: Sep. 12, 2007

(65) Prior Publication Data
US 2008/0003995 A1 Jan. 3, 2008

Related U.S. Application Data (63) Continuation of application No. PCT/JP2005/004811, filed on Mar. 17, 2005.

(51) Int. Cl.
*H04M 1/66* (2006.01)
(52) U.S. Cl. ............... 455/410; 455/411; 455/414.2; 455/456.1; 455/456.2; 455/456.3; 455/565
(58) Field of Classification Search ........ 455/41.1–41.3, 455/414.1, 414.2, 414.3, 418–421, 422.1, 455/425, 426.2, 456.1–456.6, 458, 550.1, 455/565, 410, 404.2, 411
See application file for complete search history.

(56) References Cited

U.S. PATENT DOCUMENTS

| | | | |
|---|---|---|---|
| 6,379,129 B1 | 4/2002 | Obara | |
| 7,313,383 B2 * | 12/2007 | Fujii | 455/410 |
| 2002/0082002 A1 * | 6/2002 | Fujii | 455/419 |
| 2002/0086635 A1 * | 7/2002 | Tomono | 455/1 |
| 2003/0139138 A1 * | 7/2003 | Cho et al. | 455/63 |
| 2004/0132483 A1 * | 7/2004 | Kawamoto | 455/550.1 |
| 2004/0253963 A1 * | 12/2004 | Park et al. | 455/456.2 |
| 2005/0064856 A1 * | 3/2005 | Atkin et al. | 455/418 |

FOREIGN PATENT DOCUMENTS

| | | |
|---|---|---|
| JP | 2002-27554 | 1/2002 |
| JP | 2002-101188 | 4/2002 |
| JP | 2002-112214 | 4/2002 |
| JP | 2002-252876 | 9/2002 |
| JP | 2003-87398 | 3/2003 |
| JP | 2003-274005 | 9/2003 |

OTHER PUBLICATIONS

International Search Report dated Jun. 7, 2005, from the corresponding International Application.
International Preliminary Report on Patentability and the Written Opinion of the International Searching Authority dated Sep. 27, 2007.
Notification of Reasons for Refusal dated Sep. 28, 2010, from the corresponding Japanese Application.
Notification of Reasons for Refusal dated May 10, 2011, from corresponding Japanese Application No. 2007-508005.

* cited by examiner

Primary Examiner — Junpeng Chen
(74) Attorney, Agent, or Firm — Katten Muchin Rosenman LLP (57) ABSTRACT

A mobile portable terminal includes a function suppressing section having a suppression request receiving means for receiving a suppression request for a function provided to the mobile portable terminal, an intention transmitting means for transmitting acceptance or rejection of the suppression request in response to a user operation, and a function suppressing means for executing suppression of the function in response to the suppression request in the case of acceptance; and a function suppression canceling section having a suppression cancellation command receiving means for receiving a suppression cancellation command and a function suppression canceling means for canceling the suppression of the function suppressed by the function suppressing means upon receipt of the suppression cancellation command.

5 Claims, 13 Drawing Sheets

FUNCTIONAL LIST STRUCTURE

| FUNCTION NAME | FUNCTION CODE | CONDITION (LOADED / NOT LOADED / STOPPED) |
|---|---|---|
| NAME OF FUNCTION 1 | CODE OF FUNCTION 1 | LOADING CONDITION OF FUNCTION 1 |
| NAME OF FUNCTION 2 | CODE OF FUNCTION 2 | LOADING CONDITION OF FUNCTION 2 |
| ....... | ....... | ...... |
| NAME OF FUNCTION n | CODE OF FUNCTION n | LOADING CONDITION OF FUNCTION n |

Fig. 7

ACCEPTANCE OPERATION MODE STRUCTURE

| TYPE OF ACCEPTANCE OPERATION MODE | SELECTED MODE (TOGGLE ON/OFF) |
|---|---|
| ACCEPT ALL | ※TOGGLE SETTING SELECT ONE |
| REJECT ALL | ″ |
| CHECK INDIVIDUALLY AND ACCEPT OR REJECT | ″ |

Fig. 8

ADMISSION PASS DATA STRUCTURE

| ADMISSION PASS | ATTACHED INFORMATION |
|---|---|
| TERMINAL ID ENCODED AND DISTRIBUTED BY DOORKEEPER SYSTEM | ATTACHED INFORMATION TO ADMISSION PASS |

SUPPRESSED FUNCTION MANAGEMENT TABLE

| TERMINAL ID | SUPPRESSED FUNCTION LIST | ATTACHED INFORMATION (SUCH AS QUALIFICATION OF OWNER) |
|---|---|---|
| TARMINAL ID 1 | SUPPRESSED FUNCTION LIST OF TERMINAL ID 1 | ATTACHED INFORMATION TO TERMINAL ID 1 |
| TARMINAL ID 2 | SUPPRESSED FUNCTION LIST OF TERMINAL ID 2 | ATTACHED INFORMATION TO TERMINAL ID 2 |
| ....... | ....... | ....... |
| TARMINAL ID n | SUPPRESSED FUNCTION LIST OF TERMINAL ID n | ATTACHED INFORMATION TO TERMINAL ID n |
| DEFAULT (WHEN NOT PRESENT) | DEFAULT SUPPRESSED FUNCTION LIST | DEFAULT INFORMATION |

Fig. 11

ENTRANCE

| TARMINAL ID | TIME STAMP | STATE OF ENTRANCE |
|---|---|---|
| TARMINAL ID 1 | TIME STAMP 1 | STATE OF ENTRANCE OF TERMINAL ID 1 |
| TARMINAL ID 2 | TIME STAMP 2 | STATE OF ENTRANCE OF TERMINAL ID 2 |
| ....... | ....... | ....... |
| TARMINAL ID n | TIME STAMP n | STATE OF ENTRANCE OF TERMINAL ID n |

MOBILE PORTABLE TERMINAL, ENTRANCE-EXIT MANAGING APPARATUS, AND FUNCTION SUPPRESSION CANCELLATION PROGRAM STORAGE MEDIUM

TECHNICAL FIELD

The preset invention relates to a mobile portable terminal having a wireless communication function, an entrance-exit managing apparatus for managing entrance and exit in and out of a specific location by a user having the mobile portable terminal, and a storage medium storing a function suppression cancellation program for providing the mobile portable terminal with a function of suppressing a function of the mobile portable terminal and a function of canceling the suppressed function.

BACKGROUND ART

In recent years, mobile portable terminals such as cellular telephones have spread rapidly and are equipped not only with a simple telephone function but also with various functions such as an electronic mail function, a videophone function, an electronic money function or a camera function, and thereby have become a portable composite information processing device for personal use. Moreover, portability is improved by reduction in size and weight to allow users to carry them freely at any time and any place.

One of major problems arising from such circumstances is that using the mobile portable terminals can be a nuisance to people around the user.

To solve this problem, techniques for restricting a function of a mobile portable terminal owned by a user when entering a specific location such as a concert hall, a movie theater or a hospital have been disclosed (Patent Documents 1 and 2).

Here, Patent Document 1 discloses a technique for setting up automatically a restricted state of a function of a communication device such as image shooting or sound recording at a specific location.

Meanwhile, Patent Document 2 discloses a technique for providing a special electronic device (a portable terminal control bar) to be attached to a portable terminal and thereby restricting a function of the portable device. Additionally, the technique allows people around the user of the portable terminal to visually check whether or not the function of the portable terminal is in a restricted state by using an LED mounted on the electronic device or a flag which changes the condition.

Patent Document 1: Japanese Patent Application Laid-Open Publication No. 2002-112214
Patent Document 2: Japanese Patent Application Laid-Open Publication No. 2003-274005

DISCLOSURE OF THE INVENTION

However, in the case of the technique of Patent Document 1, when a user having a portable terminal moves to a specific location, the function of the portable terminal is restricted without the consent of the user, and it is conceivable that the absence of consent of the user might not be acceptable in light of conventional wisdom. For example, for a user anticipating an urgent call, sometimes there is a possibility of incurring a serious consequence to the user when the function of the telephone is suddenly restricted without consent, and reception of a telephone call thereby becomes impossible. In this case, even if a signboard is posted at an entrance, or voice announcement is made to call attention, for example, the user is not always able to confirm the signboard certainly or to catch the announcement certainly, and there is a risk of a failure to obtain the consent of the user by such an action.

Meanwhile, in the case of the technique disclosed in Document 2 of attaching the special electronic device to the portable terminal, it is possible to regard an action of attaching the electronic device to the portable terminal as acceptance of restriction of the function by the user. However, there are many problems as follows: in order for people around to visually check whether or not the electronic device is securely attached, the portable terminal cannot be put away in a place, such as a bag or a pocket, where the portable terminal cannot be seen from people around; the people around cannot confirm that the function of the portable terminal is restricted once it is put away; a user who do not consent with restriction of the function is able to retain the portable terminal while recovering the function thereof by detaching the electronic device to put it away; moreover, it is necessary to provide the portable terminal with a connection port for connecting such a special electronic device and it is therefore likely that only such a special portable terminal becomes a target; and it is hard to distribute and collect operations of the special electronic device in a place where numerous people go in and out and there is also a risk of losses, and so forth.

In light of these circumstances, it is an object of the present invention to provide a mobile portable terminal, an entrance-exit managing apparatus, and a storage medium storing a function suppression cancellation program, which are suitable for a system for suppressing a function of a mobile portable terminal owned by a user who intends to enter a specific location under consent of the user with no exception.

A mobile portable terminal of the present invention for attaining the object is a mobile portable terminal having a wireless communication function, which includes:

a function suppressing section including a suppression request receiving means for receiving a suppression request for a function provided to the mobile portable terminal, an intention transmitting means for transmitting acceptance or rejection of the suppression request in response to a user operation, and a function suppressing means for executing suppression of the function in response to the suppression request in the case of acceptance; and a function suppression canceling section including a suppression cancellation command receiving means for receiving a suppression cancellation command and a function suppression canceling means for canceling the suppression of the function suppressed by the function suppressing means upon receipt of the suppression cancellation command.

As described above, the mobile portable terminal of the present invention includes the intension transmitting means for transmitting acceptance or rejection of the received suppression request. Accordingly, it is possible to suppress the function of the mobile portable terminal subject to voluntary consent of a user.

Here, in the mobile portable terminal of the present invention, it is preferable that the function suppressing section further includes a function suppression completion notice transmitting means for transmitting a function suppression completion notice upon completion of suppressing the function by the function suppressing means, and the mobile portable terminal further has:

an admission pass acquiring and presenting section including an admission pass receiving and retaining means for receiving and retaining an admission pass to a specific location transmitted in response to the function suppression completion notice; and an admission pass transmitting means for transmitting the admission pass upon entrance into the specific location.

By arranging this way, a procedure for suppressing the function and a procedure for entering the specific location are separated, and it is not always necessary to carry out those two procedures at the same time to achieve an accessible system.

Meanwhile, in the mobile portable terminal of the present invention, it is preferable that the suppression request receiving means receives a suppression request specifying a function subject to suppression, and the function suppressing means suppresses the function subject to suppression request by the suppression request.

It is not always necessary to suppress all the functions of the mobile portable terminal in some specific locations, and there may be a case where only a specific function of the mobile portable terminal needs to be suppressed. For example, there is a case of a concert hall where silence is expected, and it is therefore desired to suppress sounds but not necessary to suppress other functions. Meanwhile, there is also a case in a movie theater where silence and darkness is expected, and it is therefore desired to suppress sounds and light emission but necessary to suppress other functions in particular. There is also a case in a hospital where it is necessary to suppress radio but not necessary to suppress other functions such as a schedule management function or a game function.

A more flexible system is constructed by configuring the mobile portable terminal of the present invention to receive the suppression request specifying the function subject to suppression and to suppress the specified function.

Meanwhile, an entrance-exit managing apparatus for attaining the object is an entrance-exit managing apparatus for managing entrance and exit of a specific location by a user having a mobile portable terminal provided with a wireless communication function, the apparatus including:

a function suppression requesting section including a suppression request transmitting means for transmitting, toward the mobile portable terminal owned by the user, a suppression request for a function provided to the mobile portable terminal, and a user intention receiving means for receiving acceptance or rejection relevant to the suppression request from the mobile portable terminal;

an admission procedure executing section that executes an admission procedure for the user to the specific location upon receipt of suppression completion notice corresponding to the suppression request; and a suppression cancellation command transmitting section that transmits a suppression cancellation command toward the mobile portable terminal owned by the user upon exit of the user from the specific location.

By providing the entrance-exit managing apparatus, it is possible to suppress a function of the mobile portable terminal owned by the user subject to consent of the user.

Moreover, a storage medium storing a function suppression cancellation program for attaining the object is executed in a mobile portable terminal having a program execution function and a wireless communication function, and the function suppression cancellation program provides the mobile portable terminal with:

a function of a function suppressing section including a suppression request receiving means for receiving a suppression request for a function provided to the mobile portable terminal, an intention transmitting means for transmitting acceptance or rejection of the suppression request in response to a user operation, and a function suppressing means for executing suppression of the function in response to the suppression request in the case of acceptance; and a function of a function suppression canceling section including a suppression cancellation command receiving means for receiving a suppression cancellation command and a suppression canceling means for canceling, upon receipt of the suppression cancellation command, the suppression of the function suppressed by the function suppressing means.

The mobile portable terminals in recent years such as cellular telephones are subjected to addition of new functions to the mobile portable terminals and improvement in the existing functions by downloading a program in the mobile portable terminals through radio waves. By constructing the function suppression cancellation program, it is possible to construct a system for adding to the mobile portable terminal a function that meets the present invention.

According to the present invention, it is possible to securely suppress a function of a mobile portable terminal owned by a user who intends to enter a specific location under consent of the user.

BEST MODE FOR CARRYING OUT THE INVENTION

Now, an embodiment of the present invention will be described below.

Figure 1:
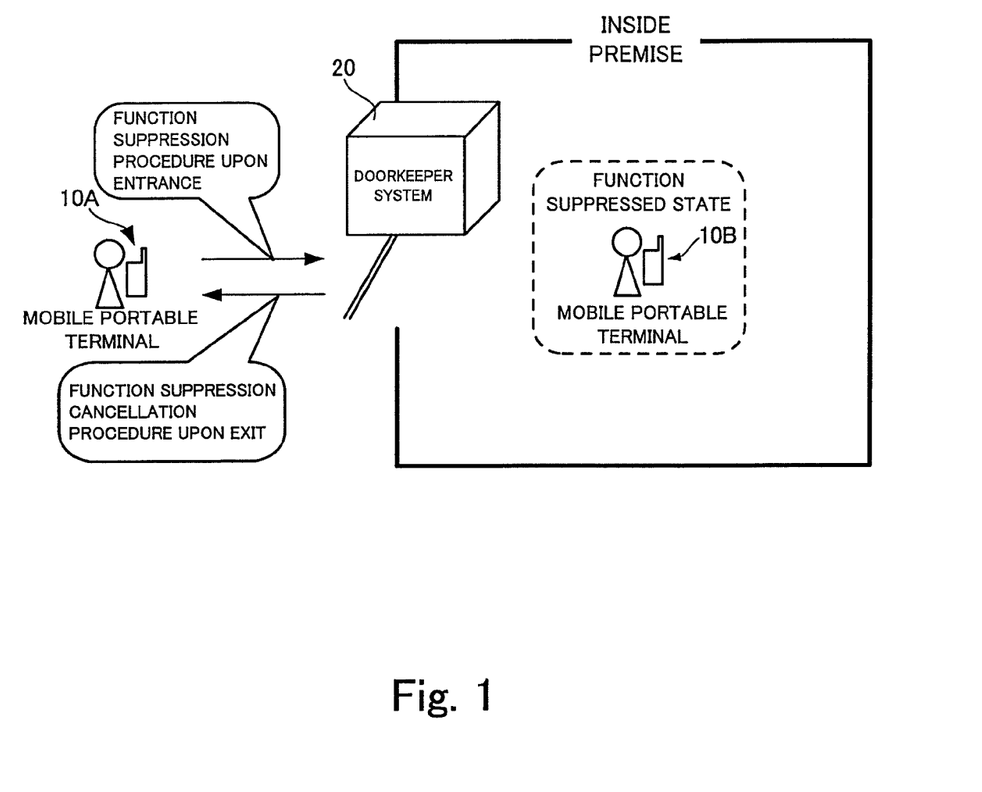
FIG. 1 is a schematic diagram showing a concept of the present invention.

FIG. 1 is an overall conceptual view showing a concept of the present invention.

A mobile portable terminal 10A owned by a user located outside a specific premise, a doorkeeper system 20 disposed at an entrance of the premise, and a mobile portable terminal 10B owned by a user located inside the premise are illustrated herein.

When the user located outside the premise enter the premise, the doorkeeper system 20 admits entrance of the user having the mobile portable terminal 10A in the premise and opens an entrance gate to the premise, only when the user agrees with suppression of part or all of functions of the mobile portable terminal 10A and actually suppresses the functions according to a function suppression command from the doorkeeper system by section of operation of the mobile portable terminal 10A by the user and communication between the mobile portable terminal 10A and the doorkeeper system 20.

The user located inside this premise has the mobile portable terminal 10B of which a function is suppressed as described above.

When the user inside this premise intends to exit from the premise, a function suppression cancellation procedure is executed between the mobile portable terminal 10B, owned by the user, and the doorkeeper system 20, and then the user exits after receiving suppression cancellation of the suppressed function.

Figure 2:
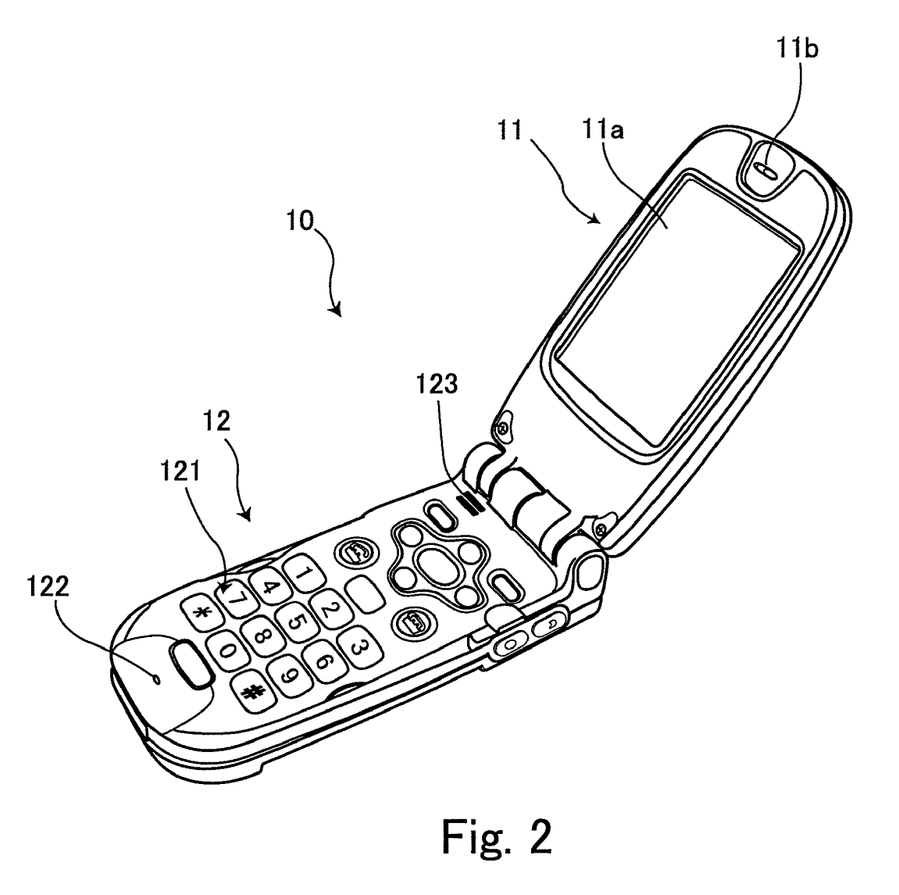
FIG. 2 is an external perspective view of a mobile portable terminal as one embodiment of the present invention.

FIG. 2 is an external perspective view of a mobile portable terminal as one embodiment of the preset invention.

This mobile portable terminal 10 includes an upper housing 11 and a lower housing 12 which open and close mutually. The upper housing 11 is provided with a LCD 11A for image display and an earpiece 11B equipped with a small speaker inside and put to the ear for listening to the voices.

Meanwhile, the lower housing 12 is provided with various operation keys 121 to be operated by the user for making a telephone call, sending an electronic mail, and performing various settings by use of this mobile portable terminal 10, a mouthpiece 122 incorporating a microphone for picking up voices of the user and being configured to guide the voices to the microphone, and a sound outlet 123 incorporating a slightly larger speaker inside and being configured to output voices at an audible sound level without being put to the ear.

Moreover, a lens for a camera, an antenna for wireless communication, and the like are provided on a backside not illustrated in FIG. 1.

Figure 3:
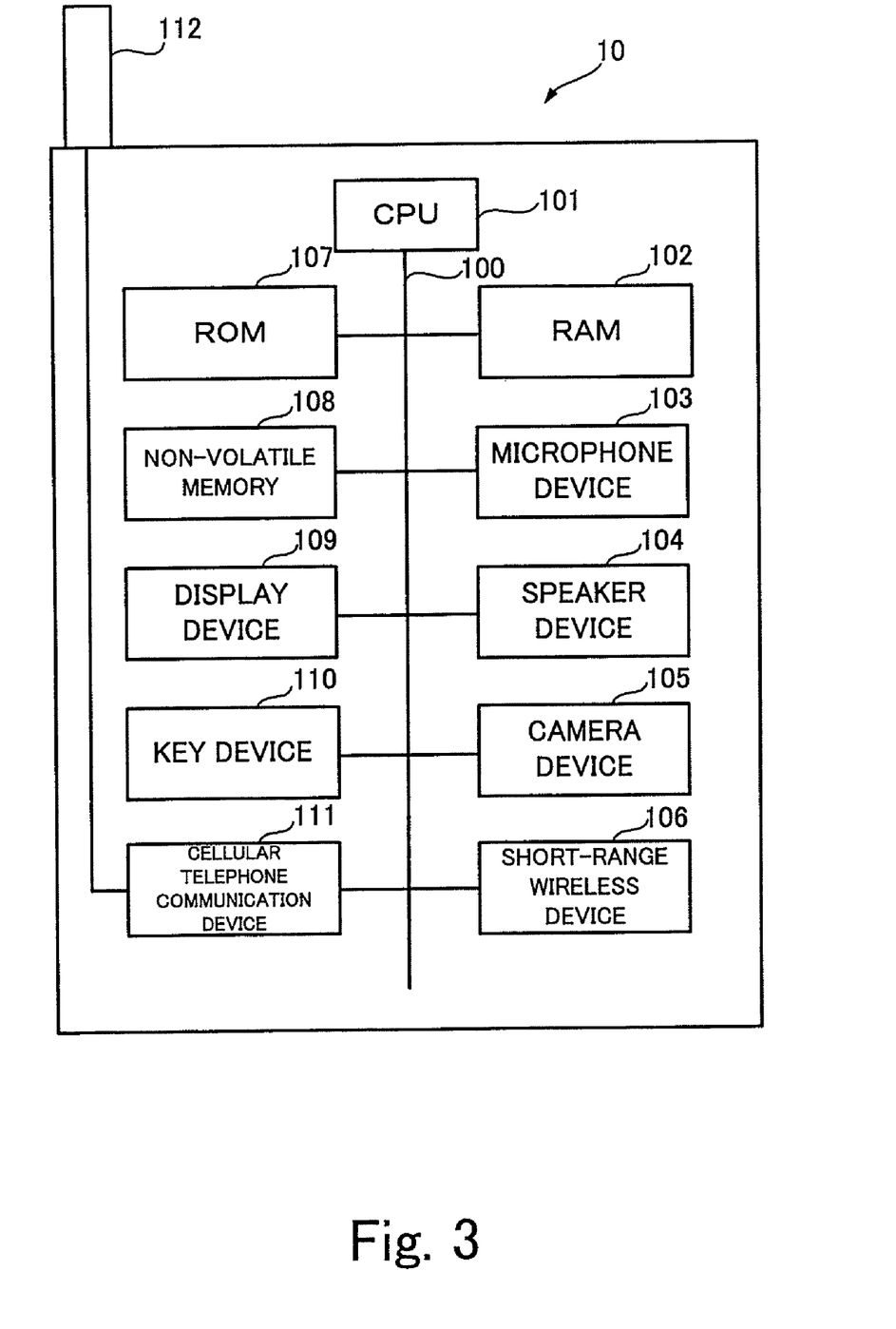
FIG. 3 is an internal block diagram of the mobile portable terminal shown in FIG. 2.

FIG. 3 is an internal block diagram of the mobile portable terminal 10 shown in FIG. 2.

A CPU 101, a RAM 102, a microphone device 103, a speaker device 104, a camera device 105, a short-range wireless device 106, a ROM 107, a non-volatile memory 108, a display device 109, a key device 110, a cellular telephone communication device 111, and an antenna 112 are illustrated herein. Except the antenna 112, these constituents are connected to one another through a bus 100.

The CPU 101 has a function to execute various programs and controls the entire mobile portable terminal 10.

The various programs to be executed by the CPU 101 and various constants necessary for execution of the various programs are stored in the ROM 107. The CPU 101 executes the programs stored in the ROM 107 while using the RAM 102 as a work area.

Various setting conditions and the like, which can be rewritten, for this mobile portable terminal 10 are recorded on the non-volatile memory 108.

The microphone device 103 includes the microphone for picking up the voices of the user and a functional block for processing the voices picked up with the microphone.

The speaker device 104 includes the speaker for outputting the voices toward the user and is a functional block for generating voice signals for driving the speakers.

In this embodiment, the short-range wireless device 106 is a device for executing short-range wireless communication in compliance with the Bluetooth specifications, which is used herein for communication with the doorkeeper system 20 shown in FIG. 1.

Although it is described as the device for executing the short-range wireless communication in compliance with the Bluetooth specification, it is also possible to employ other short-range wireless communicating means such as infrared communication.

Meanwhile, the camera device 105 is a block that controls image data collection by shooting operation; the display device 109 is a block that controls image display on the LCD 11A shown in FIG. 2; and the key device 110 is a block that detects key operations with the various operation keys 121 (see FIG. 2) by the user.

Meanwhile, the cellular telephone communication device 111 handles transmission and reception of telephone calls as well as transmission and reception of electronic mails and the like via the antenna 112.

Figure 4:
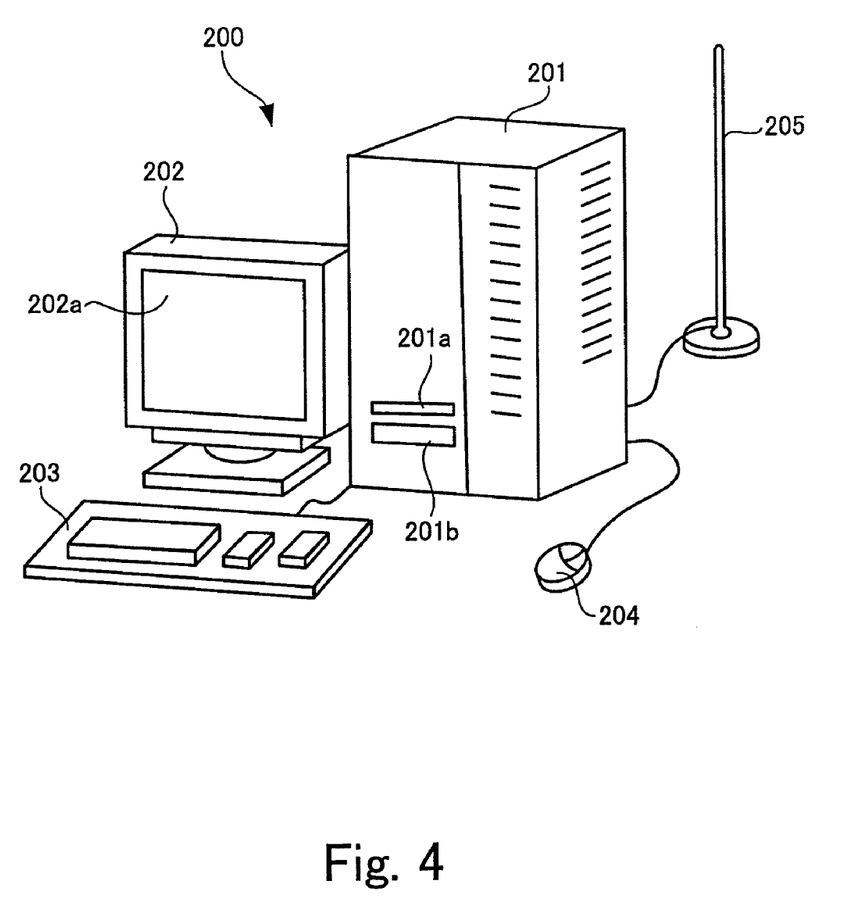
FIG. 4 is an external view of a computer system constituting a doorkeeper system.

FIG. 4 is an external view of a computer system constituting the doorkeeper system 20.

A main device 201, a display 202, a keyboard 203, a mouse 204, and an antenna 205 are illustrated in this FIG. 4 as constituents of a computer system 200.

A CPU, a RAM, a hard disk, a communication board, an MO drive for driving an MO disk (a magneto-optical disk) loaded thereon, a CD-DVD drive for driving a CD or a DVD loaded thereon, and the like are provided in the main device 201. Moreover, from the viewpoint of appearance, an MO inlet 201a for loading the MO, and a CD-DVD inlet 201b for loading the CD or DVD are provided.

In addition, the display 202 displays images and character strings on a display screen 202a in accordance with instructions from the main device 201.

Further, the keyboard 203 is a unit in which numerous operation keys are arranged for inputting instructions by an operator, and the mouse 204 is a pointing device for designating an arbitrary position on the display screen 202a and thereby for giving an instruction corresponding to an icon or the like displayed in the designated position.

Moreover, the antenna 205 is a unit for executing the short-range wireless communication in compliance with the Bluetooth standards with the mobile portable terminal 10 shown in FIG. 2 and FIG. 3.

Figure 5:
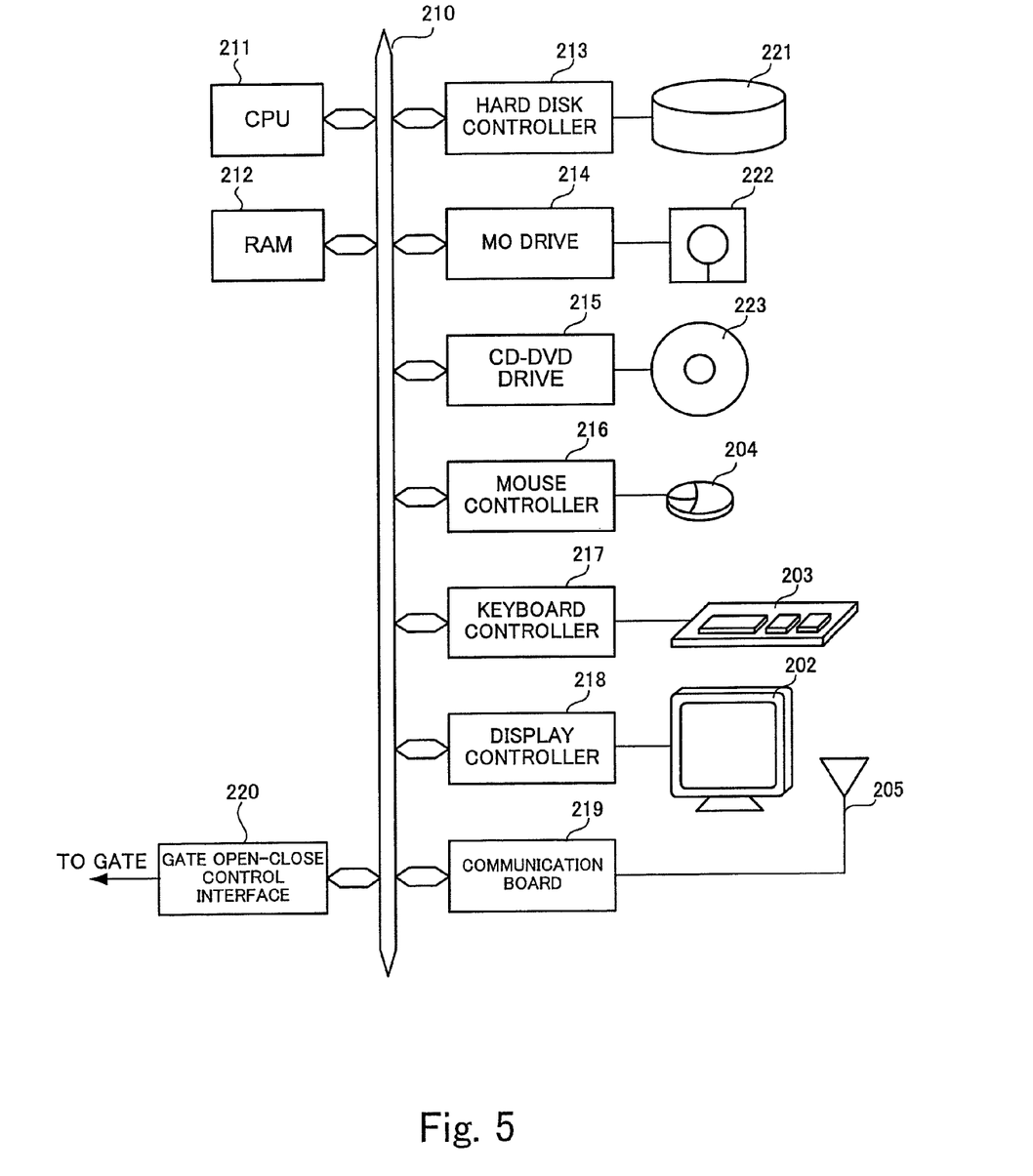
FIG. 5 is a hardware block diagram of the computer system, the external view of which is shown in FIG. 4.

FIG. 5 is a hardware block diagram of the computer system 200, the external view of which is shown in FIG. 4.

A CPU 211, a RAM 212, a hard disk controller 213, an MO drive 214, a CD-DVD drive 215, a mouse controller 216, a keyboard controller 217, a display controller 218, a communication board 219, and a gate open-close control interface 220 are illustrated in the hardware block diagram shown in FIG. 5. These constituents are connected to one another by a bus 210.

Moreover, a hard disk 221 accessed by the hard disk controller 213, the mouse 204 controlled by the mouse controller 216, the keyboard 203 controlled by the keyboard controller, and the display 202 controlled by the display controller 218 are also illustrated in this FIG. 5.

The CPU 211 is a unit for executing a program stored in the hard disk 211 and developed at the RAM 212.

Meanwhile, as described with reference to FIG. 4, the MO drive 214 and the CD-DVD drive 215 are units for accessing an MO 222 and a CD-DVD 223 loaded from the MO inlet 201a and the CD-DVD inlet 201b, respectively.

In addition, the communication board 219 handles signal processing for executing communication in compliance with the Bluetooth standards with the mobile portable terminal 10 shown in FIG. 2 and FIG. 3 via the antenna 205.

Furthermore, the gate open-close control interface 220 is an interface connected to a control device (not shown) for handling opening and closing operations of the gate for entrance or exit of the user respectively in or out of the premise shown in FIG. 1 which is configured to give an instruction to the control device for opening or closing the gate.

Figure 6:
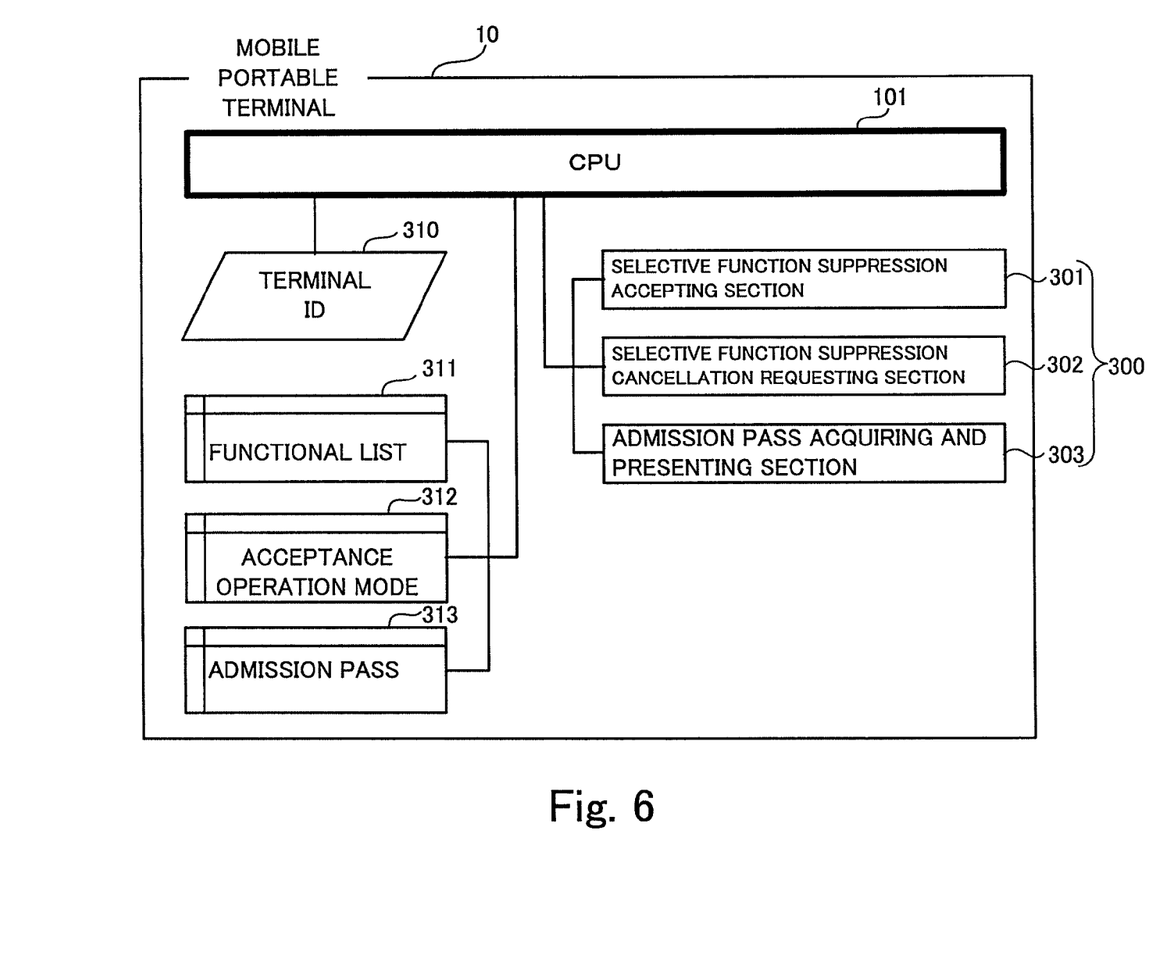
FIG. 6 shows a function suppression cancellation program as one embodiment of the present invention.

FIG. 6 shows a function suppression cancellation program as one embodiment of the present invention, which is executed by the CPU 101 (see FIG. 3) of the mobile portable terminal 10 shown in FIG. 2 and FIG. 3.

A function suppression cancellation program 300 executed by the CPU 101 includes a selective function suppression accepting section 301, a selective function suppression cancellation requesting section 302, and an admission pass acquiring section 303. Processes by this function suppression cancellation program 300 will be described later.

In this FIG. 6, the selective function suppression accepting section 301, the selective function suppression cancellation requesting section 302, and the admission pass acquiring section 303 are shown as program components constituting the function suppression cancellation program 300. However, the functions themselves realized by execution of these program components by the CPU 101 will also use the same names corresponding to the program components, and description will be made without discriminating them from the program components themselves except for the case where discrimination is particularly necessary.

When the function suppression cancellation program 300 is executed by the CPU 101, reference is made to a terminal ID 310, a functional list 311, an acceptance operation mode 312, and an admission pass 313, or data are written therein.

The terminal ID 310 is an ID of this mobile portable terminal 10, which is non-rewritably recorded on the ROM 107 or the non-volatile memory 108 shown in FIG. 3.

Figure 7:
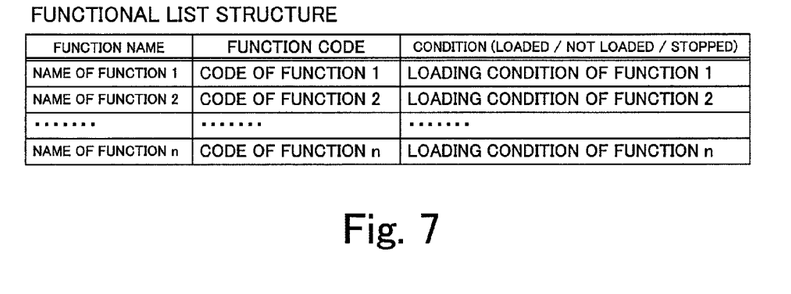
FIG. 7 shows a functional list structure.

FIG. 7 shows a functional list structure.

As shown in FIG. 7, the functional list 311 illustrated in FIG. 6 includes sets of function names, function codes, and loading conditions of the functions (that the function is loaded/not loaded/loaded but the function is shut down because of a contract or the like with a communication carrier that this mobile portable terminal 10 joins, for example). In this embodiment, this functional list is stored in the non-volatile memory 108 shown in FIG. 3 and is rewritten when there are addition, deletion, or changes in the loading conditions of the functions.

Figure 8:
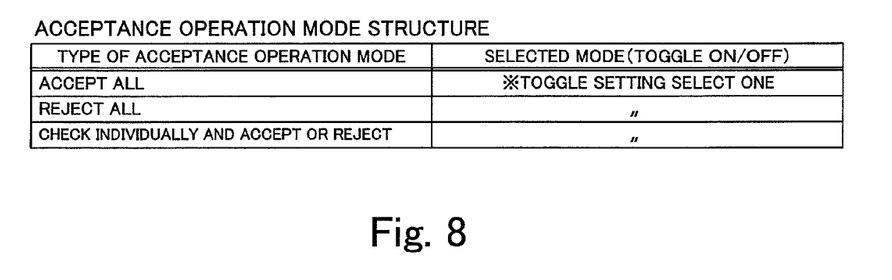
FIG. 8 shows an acceptance operation mode structure.

FIG. 8 shows an acceptance operation mode structure.

The doorkeeper program 20 shown in FIG. 1 issues a request for function suppression to the mobile portable terminal while designating a specific function or all the functions when the user having the mobile portable terminal intends to enter the premise. In this case, options shown in FIG. 8, namely, an option to accept all the functions subject to request for suppression by the doorkeeper system 20 without individual check, an option to reject the entire request, and an option to individually check the functions subject to request for suppression and then to accept or reject them are granted to the user. However, even in the case of individual check, the acceptance or rejection is selected not depending on the individual functions, but the acceptance or rejection is supposed to be selected in a lump.

In this embodiment, screen creation data corresponding to this acceptance operation mode shown in FIG. 8 are stored in the non-volatile memory 108. A suppressed function list representing the functions to be suppressed are notified (transmitted by the short-range wireless communication) from the doorkeeper system 20. Upon receipt of this suppressed function rest, a display screen for selecting a certain option out of the options illustrated in FIG. 8 is created based on the screen creation data stored in the non-volatile memory 108 and is displayed on the LCD 11A (FIG. 1). When the option for individual check is selected, then the suppressed function list transmitted from the doorkeeper system 20 is displayed on the LCD 111 and an accepting or rejecting operation will be carried out by the user.

Figure 9:
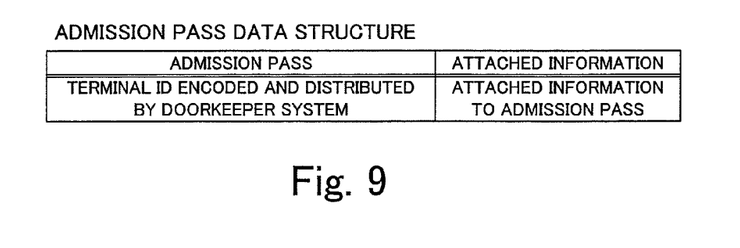
FIG. 9 shows a data structure of an admission pass.

FIG. 9 shows a data structure of an admission pass.

An admission pass of which a data structure is illustrated in this FIG. 9 includes a terminal ID to be used as an admission pass and attached information (such as information concerning the date and time range of admission), which are distributed from the doorkeeper system in an encoded form.

This admission pass (including the attached information) is distributed from the doorkeeper system 20 by means of the short-range wireless communication, and the received admission pass is tentatively stored in the non-volatile memory 108 shown in FIG. 3 and is presented (transmitted by the short-range wireless communication) to the doorkeeper system 20 upon presentation request from the doorkeeper system 20.

Figure 10:
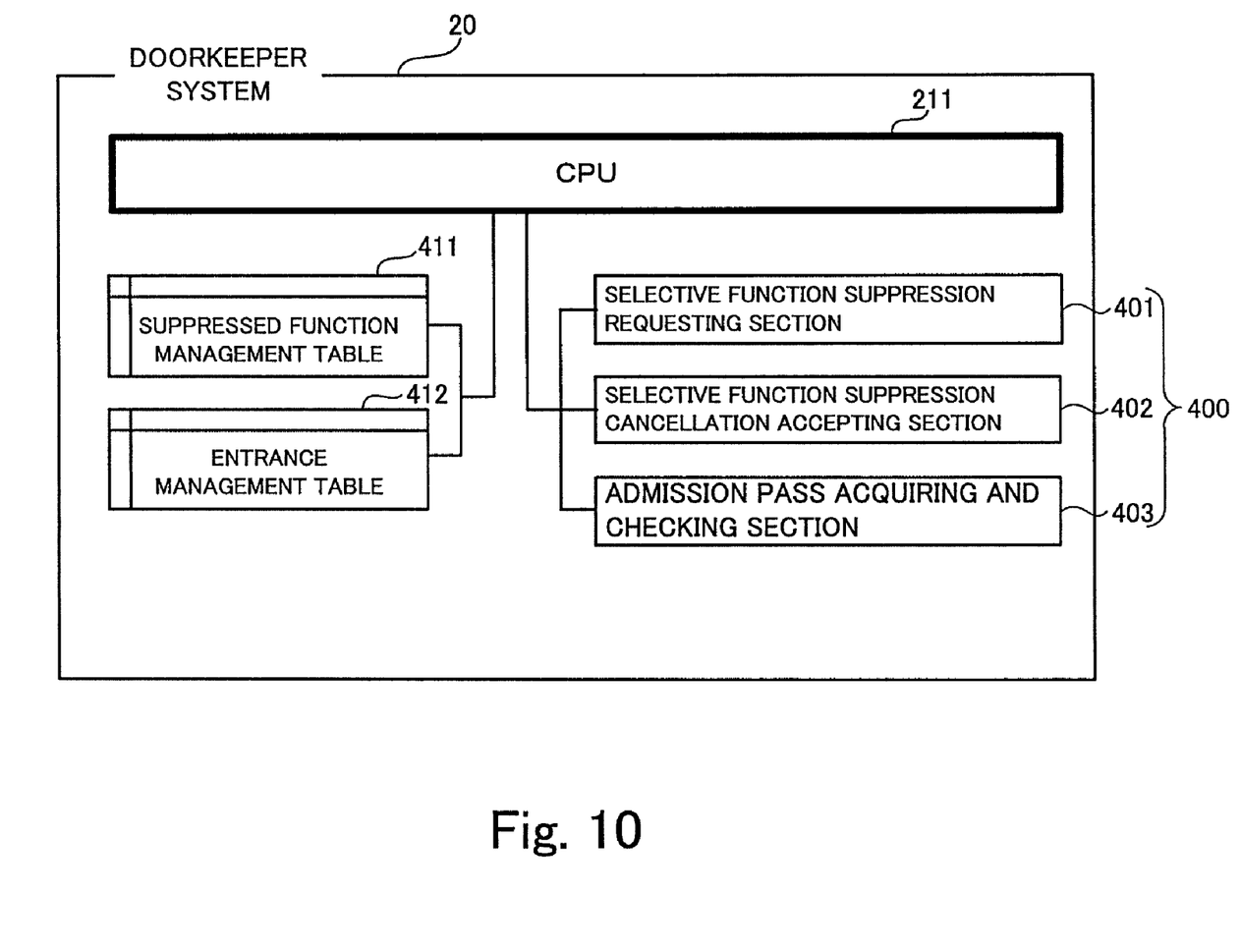
FIG. 10 shows a doorkeeper program for causing the computer system to operate as the doorkeeper system shown in FIG. 1.

FIG. 10 shows a doorkeeper program to be executed by the CPU 211 (see FIG. 5) of the computer system 200 shown in FIG. 4 and FIG. 5 so as to operate the computer system 200 as the doorkeeper system 20 shown in FIG. 1.

A doorkeeper program 400 to be executed by the CPU 211 includes a selective function suppression requesting section 401, a selective function suppression cancellation requesting section 402, and an admission pass issuing and checking section 403. Processes by this doorkeeper program 400 will also be described later together with the processes by the function suppression cancellation program 300 shown in FIG. 6.

Also similar to FIG. 6, in this FIG. 10, the selective function suppression requesting section 401, the selective function suppression cancellation requesting section 402, and the admission pass issuing and checking section 403 are shown as program components constituting the doorkeeper program 400. However, the functions themselves to be realized by execution of these program components by the CPU 211 will also use the same names to the respective program components, and description will be made without discriminating them from the program components themselves except for the case where discrimination is particularly necessary.

Reference is made to a suppressed function management table 411 and an entrance management table 412 when the doorkeeper program 400 is executed by the CPU 211. The suppressed function management table 411 and the entrance management table 412 are stored in the hard disk 221 shown in FIG. 5.

Figure 11:
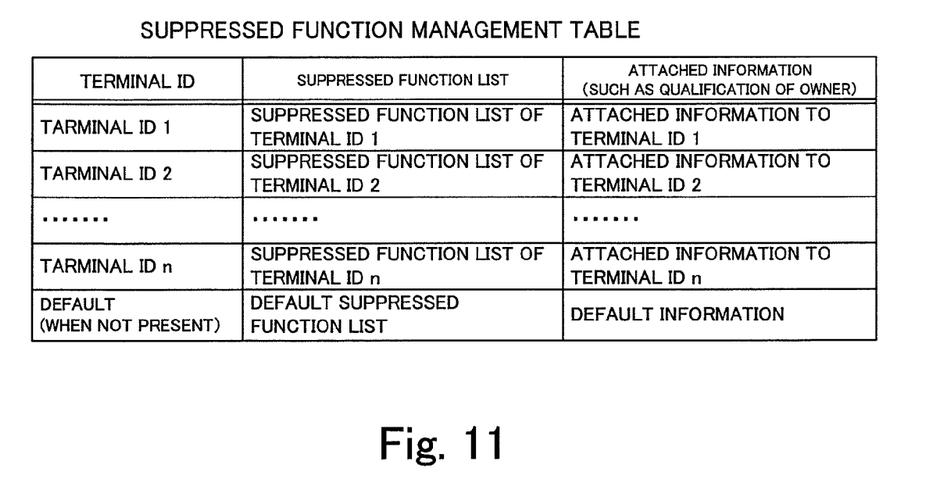
FIG. 11 shows a suppressed function management table.

FIG. 11 shows the suppressed function management table which is indicated with one block in FIG. 10.

Here, sets of "terminal ID", "suppressed function list", and "attached information" are recorded. The reason why the suppressed functions are not common to all mobile portable terminals is to carry out function suppression over mobile portable terminals owned by general audience in accordance with a default suppressed function list on the assumption of a theater, for example. In the meantime, the terminal IDs of the mobile portable terminals owned by staff of the theater, actors, and the like other than the general public are registered in advance to carry out function suppression in accordance with a suppressed function list which is different from one applicable to the general audience.

Figure 12:
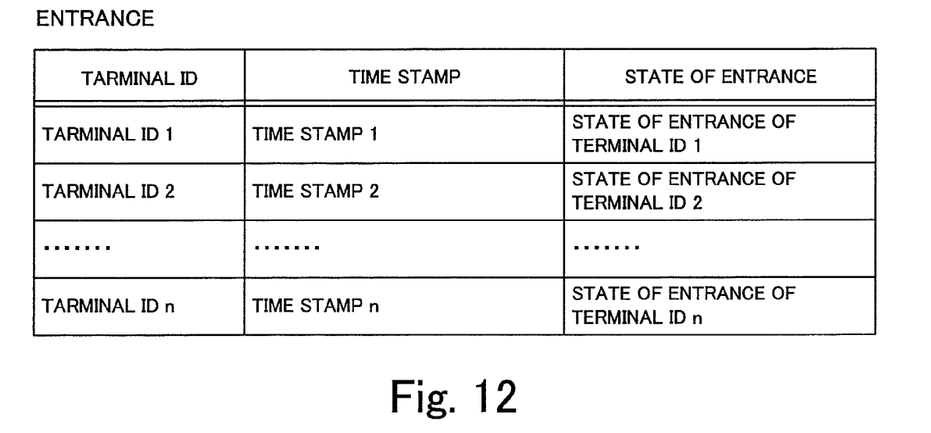
FIG. 12 shows an entrance management table.

FIG. 12 shows the entrance management table which is indicated with one block in FIG. 10.

Here, sets of "terminal ID", "time stamp" and "state of entrance" are recorded.

The "time stamp" is a time range of distribution of the admission pass to the mobile portable terminal having the corresponding terminal ID, and the "state of entrance" indicates whether the user having the mobile portable terminal provided with the terminal ID is yet to enter the specific location or has entered actually.

The processes by the respective program components constituting the function suppression cancellation program 300 shown in FIG. 6 and the processes by the respective program components constituting the doorkeeper program 400 shown in FIG. 10 will be described below.

Figure 13:
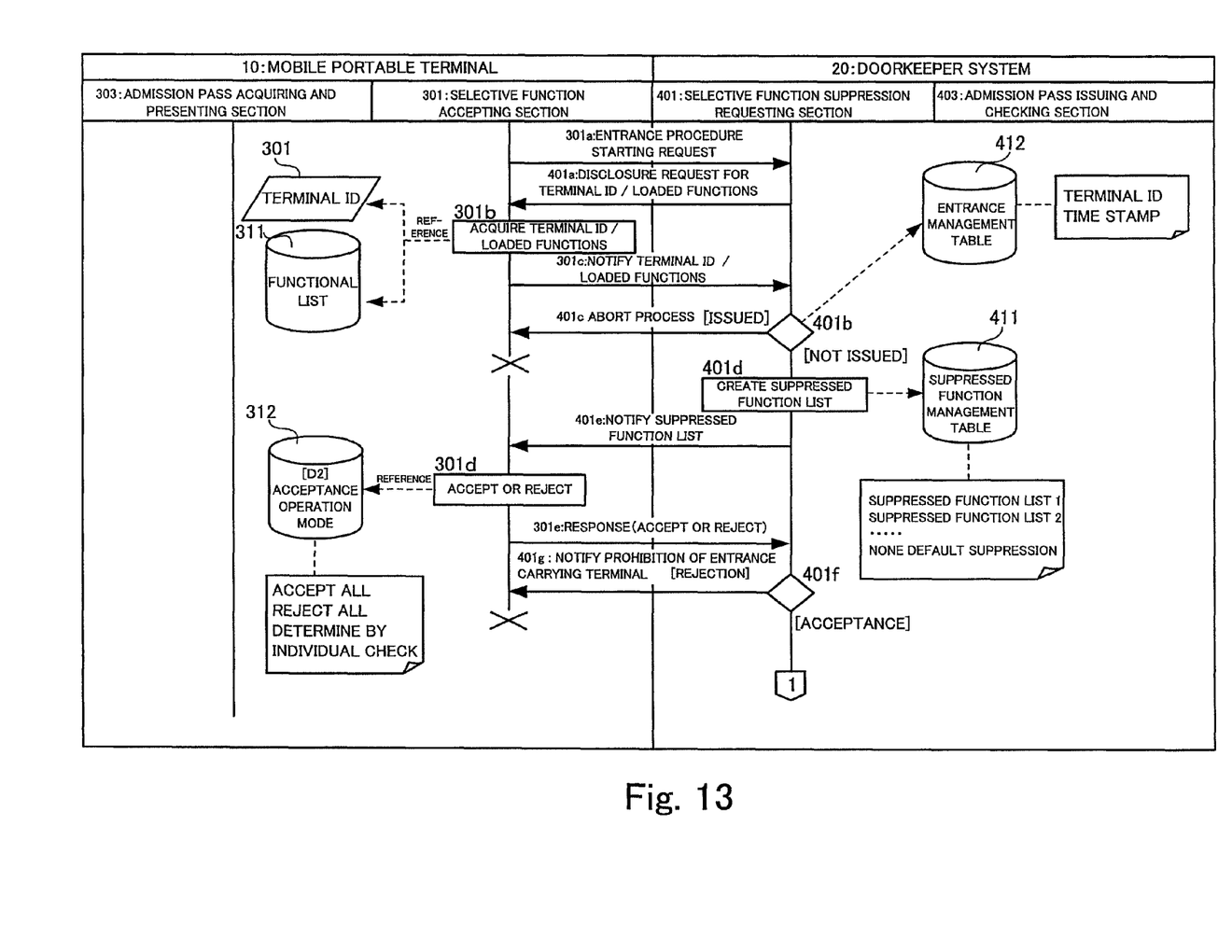
FIG. 13 shows a former half of an entrance procedure sequence.
Figure 14:
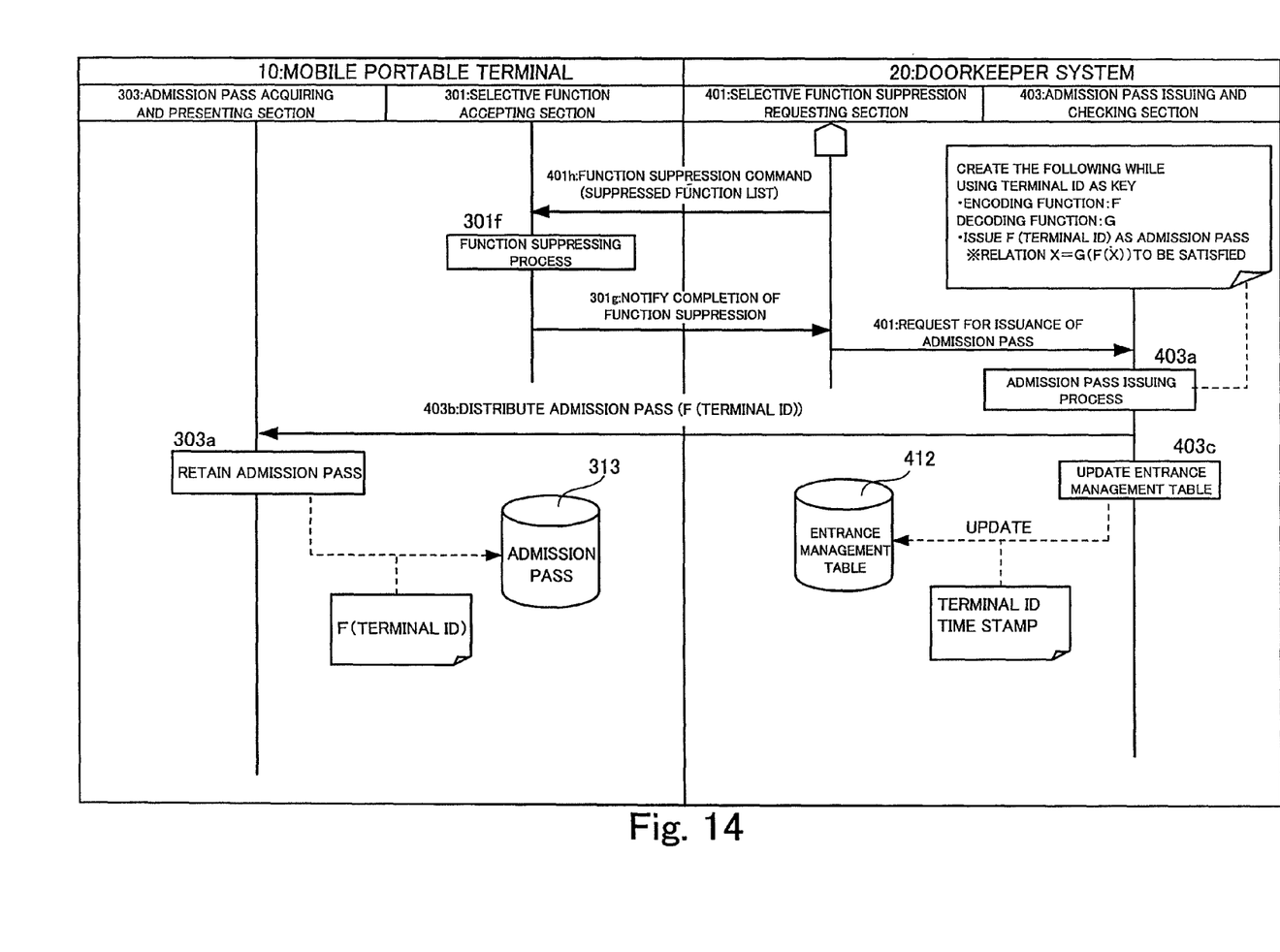
FIG. 14 shows a latter half of the entrance procedure sequence.

FIG. 13 and FIG. 14 respectively show a former half and a latter half of an entrance procedure sequence.

Reference characters attached respectively to individual processes in these FIG. 13 and FIG. 14 as well as in FIG. 15 and FIG. 16 to be described later, namely 301a, 301b, ..., 401a, 401b, and so on, for example, indicate that they represent the processes by the program components shown in FIG. 6 or FIG. 10 which are designated by the reference characters corresponding to reference characters after deleting alphabets from those reference numerals, namely, 301, 401, and so on. To be more precise, for example, reference characters 301a, 301b, and so on are the processes executed by the selective function suppression accepting section 301 which is the program component constituting the function suppression cancellation program 300 shown in FIG. 6, while reference characters 401a, 401b, and so on are the processes executed by the selective function suppression requesting section 401 which is the program component constituting the doorkeeper program 400 shown in FIG. 10. The same goes for other program components. Meanwhile, in FIG. 13 to FIG. 16, arrows that cross over between the mobile portable terminal 10 and the doorkeeper system 20 represent communication carried out by the short-range wireless communication between the mobile portable terminal 10 and the doorkeeper system 20 in compliance with the Bluetooth standards.

In the entrance procedure sequence shown in FIG. 13 and FIG. 14, firstly a start request for an entrance procedure is issued from the mobile portable terminal 10 to the doorkeeper system 20 in response to key operations of the mobile portable terminal 10 as shown in FIG. 13 (step 301a). Then, the doorkeeper system 20 responds to the request and issues, to the requesting mobile portable terminal 10, a disclosure request for the terminal ID and the functions loaded on the mobile portable terminal 10 (step 401a). In response to this disclosure request, the mobile portable terminal 10 refers to the terminal ID 310 and the functional list 311, acquires the information on the terminal ID and the loaded functions (step 301b), and then notifies the information to the doorkeeper system 20 (step 301c).

Upon receipt of this notice, the doorkeeper system 20 refers to the terminal ID and the time stamp recorded on the entrance management table 412 and judges whether or not the admission pass has been issued already for the mobile portable terminal 10 having that terminal ID (step 401b). If the admission pass has been issued already, abortion of an issuing process is notified to the mobile portable terminal 10 (step 401c). When a judgment is made in step 401b that the admission pass has not been issued, reference is made to the suppressed function management table 411 and a suppressed function list corresponding to the mobile portable terminal 10 having that terminal ID is created (step 401d), and then the suppressed function list is notified to the mobile portable terminal 10.

The mobile portable terminal 10 after receiving the suppressed function list refers to the acceptance operation mode 312, receives the user's intention of acceptance or rejection with the key operation by the user (step 301d), and then issues a response of either acceptance or rejection to the doorkeeper system 20 (step 301e).

The doorkeeper system 20 judges whether this response means acceptance or rejection (step 401f). In the case of rejection, the notice of no admittance with the mobile portable terminal 10 is notified (step 401g). In the case of acceptance, a suppression command for the functions described on the suppressed function list created in step 401d is issued to the mobile portable terminal 10 (step 401h). On the part of the mobile portable terminal 10, a function suppressing process is executed upon receipt of the function suppression command (step 301f). When the function suppressing process is completed, function suppression completion notice is issued to the doorkeeper system 20 (step 301g).

The selective function suppression requesting section 401 of the doorkeeper system 20 requests issuance of an admission pass from the admission pass issuing and checking section 403 upon reception of this function suppression completion notice. The admission pass issuing and checking section 403 executes a process for issuing an admission pass for the mobile portable terminal 10 (step 403a), distributes the admission pass to the mobile portable terminal 10 (step 403b), and then updates the entrance management table by writing the terminal ID of the mobile portable terminal 10, for which the admission pass is newly issued, as well as the time stamp representing the time range of issuance in the entrance management table 412 (step 403c).

Meanwhile, the mobile portable terminal 10 retains the received admission pass in the non-volatile memory 108 as the admission pass 313 (step 303a).

In this embodiment, F (terminal ID) is used for the admission pass, F being formed by encoding the terminal ID with an encoding function F. This admission pass can be extracted, for example, by calculating Terminal ID=G (F (terminal ID)) using a decoding function G.

In this way, the procedure for issuing the admission pass prior to entrance is completed in accordance with the entrance procedure sequence shown in FIG. 13 and FIG. 14.

Figure 15:
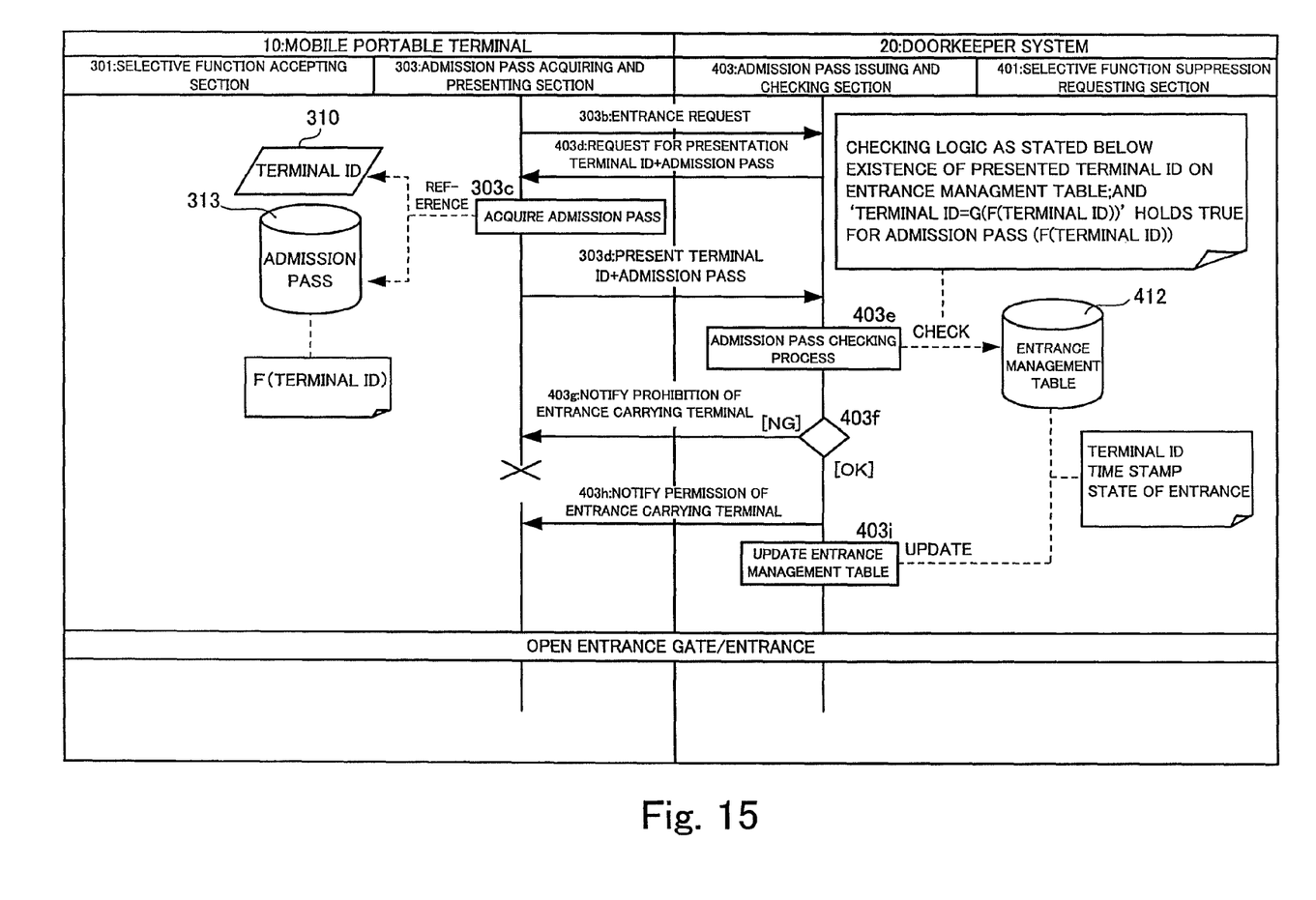
FIG. 15 shows an entrance sequence.

FIG. 15 shows an entrance sequence.

This entrance sequence is a sequence executed when the user having the mobile portable terminal 10 actually attempts to enter the premise managed by the doorkeeper system 20.

Here, an entrance request is issued from the mobile portable terminal 10 to the doorkeeper system 20 in the first place (step 303b), and the doorkeeper system 20 requests for presentation of the terminal ID and the admission pass of the mobile portable terminal 10 in response thereto (step 403d).

Then, the mobile portable terminal 10 refers to the terminal ID 310 and the admission pass 313, acquires the terminal ID and the admission pass (step 303c), and presents the terminal ID and the admission pass thus acquired to the doorkeeper system 20 (step 303d). Then, the doorkeeper system 20 performs an admission pass checking process (step 403e). Specifically, reference is herein made to the entrance management table 412 and the fact that the terminal ID received from the mobile portable terminal 10 effectively exists in the entrance management table 412 is confirmed. Then, the terminal ID is extracted from the admission pass in accordance with Terminal ID=G (F (terminal ID)). The extracted terminal ID is checked with the terminal ID, which is received as part of a pair with the admission pass from the mobile portable terminal 10 separately from the admission pass to confirm accordance.

As a result of this admission pass checking process, a judgment is made whether or not the mobile portable terminal 10 is authorized for the admission (step 403f). If the judgment is made that the mobile portable terminal 10 is not authorized for admission, then prohibition of entrance carrying the mobile portable terminal 10 is notified (step 403g). When the judgment is made that the mobile portable terminal 10 is authorized for admission, permission to entrance carrying the mobile portable terminal 10 is notified (step 403h). The entrance management table 412 is updated by changing the state of entrance (see FIG. 12) on the entrance management table 12 from not entered to entered (step 403i), and the entrance gate is opened for allowing entrance of the user having the mobile portable terminal 10.

Figure 16:
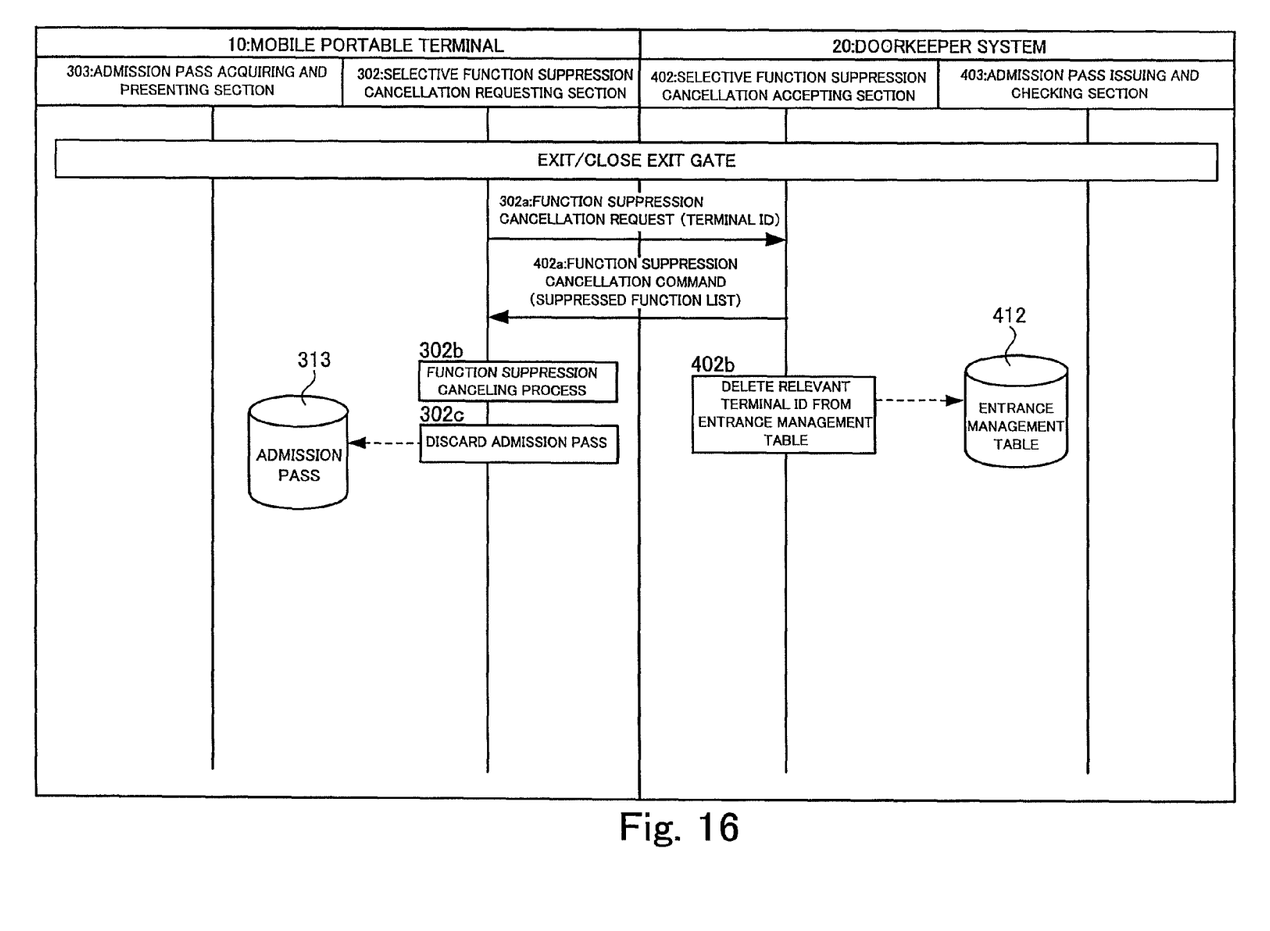
FIG. 16 shows an exit procedure sequence.

FIG. 16 shows an exit procedure sequence. This exit procedure sequence is the sequence executed when the user who has already entered the premise exits from the premise.

Here, a function suppression cancellation request is issued from the mobile portable terminal 10 to the doorkeeper system 20 by informing the terminal ID in the first place (step 302a). The doorkeeper system 20 issues a function suppression cancellation command in response thereto (step 402a) and removes the corresponding terminal ID from the entrance management table 412 (step 402b).

Meanwhile, the mobile portable terminal 10 that receives the function suppression cancellation command is subjected to a function suppression canceling process for recovering the suppressed functions (step 302b), and the admission pass is discarded (step 302c).

According to the embodiment, a person entering a premise can carry a mobile portable terminal into the premise by selectively suppressing functions prohibited by the premise subjected to entrance. In this way, it is possible to use functions permitted inside the premise. Moreover, the person entering the premise can also select an option to express rejection of function suppression and not to enter.

The invention claimed is:

1. A mobile portable terminal having a wireless communication function comprising:
    a function suppressing section that includes: a suppression request receiving section which receives a suppression request for a function provided to the mobile portable terminal; an intention transmitting section which transmits acceptance or rejection of the suppression request in response to a user operation; and a function suppressing section which executes suppression of the function in response to the suppression request in the case of acceptance; and
    a function suppression canceling section that includes: a suppression cancellation command receiving section which receives a suppression cancellation command; and a function suppression canceling section which cancels the suppression of the function suppressed by the function suppressing section upon receipt of the suppression cancellation command, wherein
    the function suppression section further includes a function suppression completion notice transmitting section which transmits a function suppression completion notice upon completion of suppressing the function by the function suppressing section, and
    the mobile portable terminal further comprises an admission pass acquiring and presenting section that includes: an admission pass receiving and retaining section which receives and retains an admission pass to a specific location transmitted in response to the function suppression completion notice; and an admission pass transmitting section which transmits the admission pass upon entrance into the specific location.

2. The mobile portable terminal according to claim 1, wherein
    the suppression request receiving section receives a suppression request specifying a function subject to suppression, and the function suppressing section suppresses the function subject to suppression request by the suppression request.

3. An entrance-exit managing apparatus for managing entrance and exit of a specific location by a user having a mobile portable terminal provided with a wireless communication function, the apparatus comprising:
    a function suppression requesting section that includes: a suppression request transmitting section which transmits, toward the mobile portable terminal owned by the user, a suppression request for a function provided to the mobile portable terminal; and a user intention receiving section which receives acceptance or rejection relevant to the suppression request from the mobile portable terminal;
    an admission procedure executing section that transmits to the mobile portable terminal an admission pass to the specific location upon receipt of suppression completion notice corresponding to the suppression request; and
    a suppression cancellation command transmitting section that transmits a suppression cancellation command toward the mobile portable terminal owned by the user upon exit of the user from the specific location.

4. The entrance-exit managing apparatus according to claim 3, wherein the admission procedure executing section transmits an admission pass to the specific location toward the mobile portable terminal upon receipt of suppression completion notice corresponding to the suppression request.

5. A non-transitory storage medium readable by a processor and storing a function suppression cancellation program executed in a mobile portable terminal having a program execution function and a wireless communication function, the function suppression cancellation program causing the mobile portable terminal to operate as:
    a function suppressing section that includes: a suppression request receiving section which receives a suppression request for a function provided to the mobile portable terminal; an intention transmitting section which transmits acceptance or rejection of the suppression request in response to a user operation; and a function suppressing section which executes suppression of the function in response to the suppression request in the case of acceptance; and
    a function suppression canceling section that includes: a suppression cancellation command receiving section which receives a suppression cancellation command; and a function suppression canceling section which cancels the suppression of the function suppressed by the function suppressing section upon receipt of the suppression cancellation command, wherein
    the function suppression section further includes a function suppression completion notice transmitting section which transmits a function suppression completion notice upon completion of suppressing the function by the function suppressing section, and
    the mobile portable terminal further comprises an admission pass acquiring and presenting section that includes: an admission pass receiving and retaining section which receives and retains an admission pass to a specific location transmitted in response to the function suppression completion notice; and an admission pass transmitting section which transmits the admission pass upon entrance into the specific location.

* * * * *